United States Patent [19]

Orvik et al.

[11] 4,140,847
[45] Feb. 20, 1979

[54] POLYMERS OF OXETANE-SPIRO-CYCLIC POLYETHERS

[75] Inventors: Jon A. Orvik; Edwin C. Steiner, both of Midland, Calif.

[73] Assignee: The Dow Chemical Company, Midland, Mich.

[21] Appl. No.: 510,873

[22] Filed: Oct. 1, 1974

[51] Int. Cl.$^2$ .................. C08G 65/02; C08G 65/18
[52] U.S. Cl. .................................. 528/403; 528/408; 526/4; 260/338; 260/327 R
[58] Field of Search ............ 260/338, 2 XA; 528/403; 526/4

[56] References Cited

U.S. PATENT DOCUMENTS 3,763,188 10/1973 Krespan ........................ 260/338

Primary Examiner—Carman J. Seccuro
Attorney, Agent, or Firm—David H. Fifield

[57] ABSTRACT

Novel linear, branched and cyclic polymers of the repeating unit

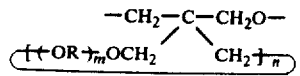

wherein R is ethylene or propylene bearing from zero to six methyl groups and m and n are lower integers and a process for utilizing said polymers to extract salts from solution are disclosed. For example, a monomer of the formula

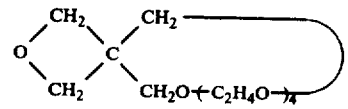

is contacted with traces of water in the presence of $BF_3$.etherate to give a homopolymer consisting essentially of repeating units of the formula

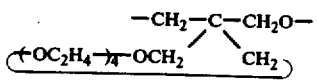

which extracts sodium salts from aqueous solution in a thermally reversible manner.

22 Claims, No Drawings

POLYMERS OF OXETANE-SPIRO-CYCLIC POLYETHERS

BACKGROUND OF THE INVENTION

The novel polymers of the invention belong to the class of polyethers comprising an oxypropylene backbone, the β-carbon atom of which is a tertiary carbon atom that is also a member of about a 3 to 10 unit cyclic polyoxyalkylene moiety.

Archer et al. in *Chem. & Ind.* 1271 (1969) describe the preparation of compounds of the formula

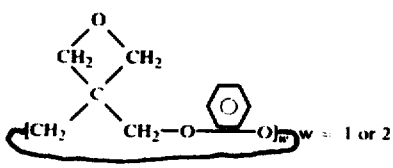

Other cyclic polyethers, capable of complexing cations, have been described by Pederson in *J. Am. Chem. Soc.* 89:7017 (1967) and in U.S. Pat. No. 3,687,978.

Polymers of the repeating unit

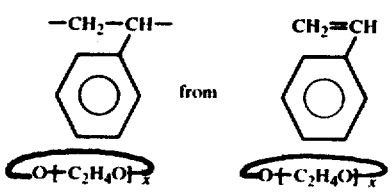

where x is 4 and 5 are described by Kopolow et al. in *Macromolecules* 4:359 (1971). Farthing, in Chapter 5 of "High Polymers" Vol. XIII, (Interscience, 1963), describes the preparation of polyoxypropylene polymers of the repeating unit

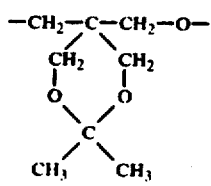

by the catalytic effect of boron trifluoride on the oxetane bearing monomer. Polymers of the repeating unit

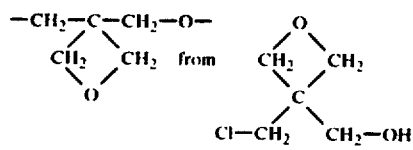

are also described by Farthing.

Compounds with polyoxyalkylene cyclomer functional groups have been shown to form complexes with certain alkali and alkaline earth metal cations in U.S. Pat. Nos. 3,562,295 and 3,686,225.

Cyclic oligomers of the formula

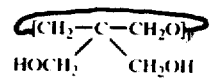

where y is 2-9 are described in U.S. Pat. No. 2,468,722.

SUMMARY OF THE INVENTION

The invention consists of novel linear and branched polymers which may be lightly cross-linked, comprising repeating ring-opened oxetane units of the formula

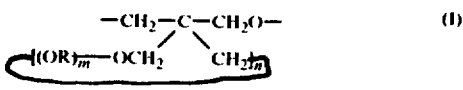

(I)

wherein m is independently, each occurrence, zero or an integer from 1 to about 10, n is an integer from 1 to 4 and —R— is an alkylene group represented by the formula

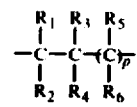

where p is zero or one and $R_1$–$R_6$ are independently hydrogen or methyl, and provided that the product of at least one m and n is at least 2; and cyclic oligomers of the same repeating ring-opened oxetane unit, wherein n is 1, the ends of which are joined to form compounds of the formula

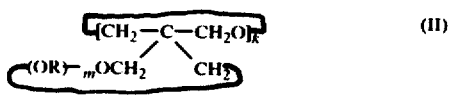

(II)

wherein k is an integer from 2 to about 6.

It has also been discovered that, water-swellable polymers of (I) wherein n is 1, m is 4 and —R— is ethylene are useful in a thermally reversible process for the extraction of sodium salts from solutions and for concentration of such solutions.

DETAILED DESCRIPTION OF THE INVENTION MONOMERS

The monomers of the formula

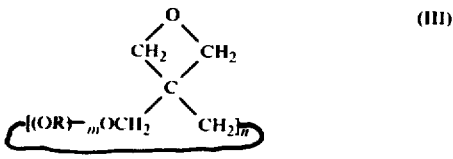

(III)

from which the invention polymers are derived are prepared by contacting a compound of the formula

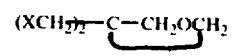

wherein X is chlorine, bromine or iodine, with about an equimolar amount of a polyoxyalkylene compound (from the corresponding polyalkylene glycol) of the formula

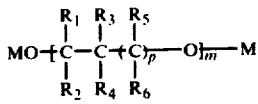

wherein m, n, p and $R_1$–$R_6$ are as defined above and M is an alkali metal, for example, sodium or potassium. These reactants are contacted under an inert atmosphere, suitably at about room temperature up to about 50° C. in a convenient solvent. When the reaction has gone substantially to completion, as determined by intermittent infrared spectoscopy or other suitable means, remaining solvent may be removed with gentle heating under vacuum. The resulting material is a mixture of MX (alkali metal halide) and a complex of this alkali metal halide with the desired monomer (III). The mixture is extracted with several washings of boiling benzene or similar suitable aprotic solvent to dissolve the cyclic ether product, leaving the insoluble metal salts behind. The solvent is then removed and the residual liquid is distilled to obtain pure (III).

The monomers used to prepare preferred polymers of the invention are those of formula (III) wherein n is 1 and m is 3 to about 7 and those wherein —R— is ethylene or 1,2-propylene. Most preferred are the compositions wherein —R— is ethylene, those where m is the same each occurrence and those where m is 3, 4 or 5. Those where —R— is ethylene and m is 3, 4 or 5 are prepared by contacting the disodium salts of triethylene, tetraethylene and pentaethylene glycol, respectively, (i.e., where m is 3, 4 or 5) with 3,3-bis(bromomethyl)oxetane. Compositions wherein —R— is 1,3-propylene may be produced from the corresponding salts of poly(trimethylene) glycols and those wherein p is zero, $R_2$ and $R_4$ are hydrogen and one of $R_1$ and $R_3$ is methyl and the other hydrogen may be similarly produced from the corresponding salts of polypropylene glycols (i.e., 1,2-propylene glycols).

Unsymmetric congeneric monomers wherein n is greater than one may be produced by selecting a mixture of polyalkylene glycol salts of varying length, i.e., a mixture of sodium salts of ethylene glycol and diethylene glycol will produce a quantity of an unsymmetric product, for example the compound of the formula

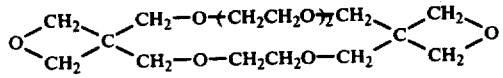

when contacted with 3,3-bis(bromomethyl)oxetane under reaction conditions. The product will also contain compounds of formula (III) where n is 1 and m is 2, of (III) where n is 2 and m is 1, of (III) where n is 2 and m is 2, and other permutations of formula (III) wherein m is zero, one or two and n is greater than one. When the salt of a single polyalkylene glycol is utilized, the monomeric product will comprise chiefly symmetric compounds but will also comprise some unsymmetric compounds where m is zero (as it may also when a mixture of glycol salts is used as described above) in one or more occurrences. However, the monomers must have at least one $+OR+_m$ moiety where m is not zero and the product of at least one m and n must be 2 or greater to be useful in preparing the polymers of the invention. In preferred monomers, m is the same integer, each occurrence, except positions where m is zero. These monomers are produced where a polyalkylene glycol salt made up of m number of $+OR+$ units is selected as one reactant. A;so preferred are monomers where m is the same each occurrence, i.e., symmetric monomers as of the formula

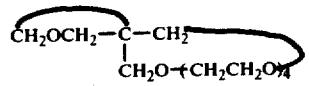

from a tetraethylene glycol salt and 3,3-bis(bromomethyl) oxetane. In monomers where m is the same integer each occurrence and n is greater than one, the product of m and n will preferably be from 2 to about 12, most preferably from 2 to 6. Coproducts of varied m and n values may be separated from one another by fractional distillation or gel permeation chromatography.

Congeneric monomers wherein n is greater than 1 ranging up to about 4 or more, are more prevelant where m is small, i.e. one or two. They are formed simultaneously with the primary product wherein n is one, as described above.

Polymers

Cyclic oligomers (II) wherein k is 2–6, and water-soluble and water-swellable linear and branched polymers of the repeating ring-opened oxetane unit (I) may be prepared by contacting a convenient quantity of (III) with a suitable initiator in the presence of a catalytic amount of boron trifluoride ($BF_3$), $BF_3$.etherate or another Lewis acid such as aluminum trichloride, phosphorous pentafluoride and the like. Contact is maintained for anywhere from a half hour up to 24 hours or longer. Contact times of about 1 to 4 hours are ordinarily suitable. At the end of this time, the catalyst is neutralized with a strong base such as sodium hydroxide. Random or block copolymers of (I) may be prepared by contacting initiator and (III) with other Lewis acid-polymerizable monomers such as other oxetanes and oxiranes in the presence of said Lewis acid catalysts.

Initiators utilized, generally in minor amounts, in preparing the invention polymers are suitably any of the initiators commonly used to initiate alkylene oxide polymerization. Compounds having active hydrogen functionality are useful in this respect. These may be mono-, di- or polyfunctional compounds. For example, alkanols, phenols, glycols and polyglycols, glycerine, pentaerythritol and their mercaptan analogs are such initiators. Preferred in the invention are polymers prepared using water or hydroxyl (preferably primary) bearing materials such as glycols, lower alkanols and lower polyols as initiators. Monomer-soluble initiators are most preferred.

Polymerization is suitably carried out at a temperature of from about −50° C. to about 80° C., conveniently between about −25° C. and 50° C. The polymerization is carried out in a convenient inert, polar organic solvent, for example, methyl chloride, methylene chloride, 1,2-dichloroethane, dimethylsulfoxide and the like. The concentration of the monomer (III) in the chosen solvent is suitably about 20% to about 35% by weight.

The product recovered after polymerization of (III) will contain a liquid mixture of congeneric cyclomers of (II) where k is primarily 3, 4, and 5, dissolved in the solvent. These cyclomers may be separated from each other by gel permeation chromatography techniques if desired. Separation of congeners is not generally necessary due to their common utility in complexing metallic salts.

Depending on their exact nature, the linear and branched polymeric products of repeating ring-opened oxetane (I) units will be recovered as water-soluble or water-swellable materials. The water-soluble materials, which are believed to be cross-linked only slightly, if at all, will be recovered with the water-soluble cyclomers described above by extracting them from the swellable, more highly cross-linked materials; conveniently by extracting the product mixture with methyl chloride, methylene chloride, benzene or other suitable solvent. The cyclomer: water-soluble polymer mix may then be separated by gel permeation chromatography (or fractional distillation for the lower molecular weight materials). The insoluble, water-swellable polymers are subsequently dried to remove the solvent.

The branched polymers are obtained by initiating the polymerization with an initiator which is at least trifunctional, as by glycerine, for example. These branched polymers will generally be of a water-soluble nature.

Cross-linking will occur to a greater or lesser extent with a trend toward water-insolubility and water-swellability with higher cross-linking. It has been noted, however, that when only trace amounts of initiator are present, most of the product is water-swellable, whereas when greater amounts of initiator are present, the product is primarily water-soluble. Cross-linking probably occurs by the opening and joining of polyoxyalkylene rings. When n is greater than one, cross-linking can also occur through the multiple oxetane functional groups. The mechanism postulated is not intended to limit the scope of the invention.

Preferred embodiments of the polymers of the invention are those produced from the monomer (III) wherein n is 1 and m is 3 to about 7 and those wherein —R— is ethylene or 1,2-propylene. With respect to the cyclomeric form, those cyclomers (II) wherein m is 3 to about 7, k is 3, 4 or 5 and those wherein —R— is ethylene are especially preferred. With respect to linear and branched polymers, those polymers of repeating ring-opened oxetane (I) units wherein n is 1 and m is 3 to about 7, and those wherein —R— is ethylene are preferred with those wherein m is 3, 4 or 5 being especially preferred. Most preferred are polymers wherein m is the same, each occurrence.

Salt Complexation

The novel ring-opened oxetane polymers described herein are useful as complexing agents, to a greater or lesser degree, for the salts of alkali metals and alkaline earth metals. This complexing capability may be used to absorb such salts from solution and to concentrate such salt solutions. Removal is accomplished by contacting one of the polymers, preferably one of the water-swellable polymers which has been dried and ground to a convenient particle size, with a chosen salt solution, preferably at a temperature below about 15° C. The remaining non-absorbed salt solution is then decontacted from the complexed polymer by conventional means. The complexed salt may thereafter be substantially washed from the polymer by contacting the polymer with an aqueous solution, preferably with substantially deionized water at a temperature above about 65° C. and separating the polymer from the resulting aqueous salt solution. In a preferred embodiment, a water-swellable polymer of the repeating unit (I) wherein m is 4, and —R— is ethylene, is contacted with an aqueous solution about 0.1 M or less in sodium salts at a temperature below about 15° C. The polymer absorbs some salt solution. After decontacting the remaining non-absorbed solution, the swollen polymer is heated above about 65° C. whereupon aqueous solution, whose salt concentration is greater than that of the original solution, is expelled from the polymer.

In a like manner, other alkali and alkaline earth metal salt solutions, preferably of less than about 0.1 molarity, are contacted with a water-swellable polymer of the invention at temperatures below about 30° C., preferably below 15° C., the remaining solution is decontacted from the salt-polymer complex by conventional means and the polymer thereafter contacted with an aqueous solution at a temperature above about 30° C., preferably above 65° C., to substantially reverse the absorption step.

As the individual water-swellable polymers of different m and n values demonstrate varying affinity for different salts, this property may be used to separate, to a certain extent, different salts by selection of the appropriate resin. It may likewise be utilized to concentrate one or more salts in a solution vis-a-vis other salts. Since temperature differential reverses the phenomenon, such a polymer may be alternately contacted with cold and hot quantities of the same salt solution with a resultant decrease in concentration of certain salts in solution in the cold step and increase in concentration of those salts in the hot step. In some cases, as shown in the examples the absorption of certain salts is retarded relative to the absorption of other salts. In either case, salt absorption or relative non-absorption, a concentrating effect results which may be employed in a beneficial manner.

Other salts to which this process may be applied are, for example, sodium sulfate, sodium carbonate, sodium nitrate, sodium nitrite, sodium thiocyanate, and the potassium analogs thereof, calcium chloride, calcium nitrate, calcium nitrite and the like. Generally, sodium salts are preferentially absorbed by polymers from monomers where the sum of all m's and n is 5 and potassium salts by polymers where the sum is 6.

SPECIFIC EMBODIMENTS OF THE INVENTION

EXAMPLE 1 — Preparation of Oxetane Monomers.

A solution consisting of 0.292 mole of the disodium salt of tetraethylene glycol in about 90 ml. of t-butanol was placed in a nitrogen-purged flask equipped with mechanical stirrer and a condenser. To this was added 74.43 g. (0.305 mole) of 3,3-bis(bromomethyl) oxetane which dissolved to give a clear solution. The solution was then heated to reflux temperature and maintained (at about 85° C. pot temperature) for about 2 hours. Heating was discontinued and the mixture was vacuum filtered while still warm to separate a white solid, found to be sodium bromide, which had formed. Upon evaporation of the filtrate, crystals and 35 g. of a yellow oil remained. By distillation, about 12 g. of product, shown by analysis to be the monomer of the formula

(IIIa)

was recovered.

In a like manner, monomers of the formulas

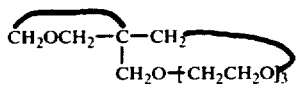
(IIIb)

and

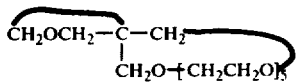
(IIIc)

were prepared.

EXAMPLE 2 — Water Initiated Polymerization

Monomer (IIIa), 20.96 g. (0.076 mole) was placed in a flamed-out, nitrogen-purged flask equipped with a dry ice-acetone filled Dewar condenser. About 65 ml. of methyl chloride was distilled over into the flask, dissolving the monomer. The catalyst containing trace amounts of water was prepared by dissolving 0.8 g. of $BF_3$. etherate (45% $BF_3$) in sufficient methylene chloride to make about 6 ml. of catalyst solution and 5.5 ml. of this solution (0.33 g. $BF_3$) was slowly added over 15 minutes to the refluxing monomer solution without observance of any vigorous exotherm. A small sample was removed after about 90 minutes contact time, the sample then having a gel-like appearance when splattered on the wall of the flask. When the methyl chloride solvent was evaporated, a foamed, elastic solid which was water-insoluble was produced. After 3 hours of contact, the solvent of the entire reaction mixture was evaporated, leaving a gelatinous, rubbery mass. Overnight exposure of the mass to the atmosphere resulted in a blackening of its lower portion, possibly due to unneutralized $BF_3$. This product was decolorized by grinding the mass with several portions of distilled water. Residual acidity was noted when the washings were tested so the ground polymer-water slurry was titrated with 0.1N sodium hydroxide solution until all residual acid had been neutralized. The hydrated ground mass was vacuum filtered to give 48.8 g. product which dried under room conditions to give 18.05 g. of a dry, off-white solid. This solid was insoluble in water, alcohols, methyl chloride, methylene chloride and dimethyl sulfoxide but was swollen by each of the solvents. One gram of dry polymer, at room temperature, absorbed 1.74 g. of water upon hydration and isolation by vacuum filtration.

In a like manner, polymers are prepared from the monomers (IIIb) and (IIIc).

EXAMPLE 3 — Water Initiated Polymerization for Water Soluble Polymers

In a manner similar to Example 2, monomer (IIIa) was polymerized with $BF_3$. etherate catalyst. The initiator uses was again water but in this instance, in substantial quantities rather than trace amounts. It was desired to obtain essentially linear, water-soluble homopolymers. Monomer (IIIa) (from 4–6 g.) was contacted with water and 3 drops of catalyst in three runs. The (IIIa):-water molar ratios were about 1:1, 11:1 and 50:1. In the third run, about 14 g. of methylene chloride was added as a solvent. In the first two runs, the mixture was heated gently for a short time then placed in an ice bath. The third run was allowed to proceed overnight at room temperature. Gel phase chromatography (GPC) showed the first reaction mixture to contain some product of average molecular weight about 560, thought to be mainly a dimer. The second, water-soluble product, a sticky viscous liquid, was shown by GPC to have an average molecular weight of about 2500 and the third product showed GPC peaks at about 700 and 30,000 average molecular weight. The water-soluble product of the second run of about 2500 average molecular weight is useful as a prepolymer for polyurethanes or polyesters which may be cast as films useful as salt selective permeable membranes.

EXAMPLE 4 — Methanol Initiated Polymerization

Concentrated sulfuric acid (0.3 ml.) was added to a stirred solution of 0.64 g. (0.02 mole) distilled methanol and 27.6 g. (0.10 mole) of the oxetane monomer (IIIa) in 50 ml. of methylane chloride at room temperature. This solution was heated to reflux for about two hours, cooled to room temperature and 2.0 g. of potassium carbonate were added to neutralize the acid. Methylene chloride was removed by vacuum distillation and the residue was dissolved in 100 ml. benzene, filtered and concentrated. Gel permeation chromatography and analysis for hydroxyl groups indicated the product was an oligomer represented by the formula

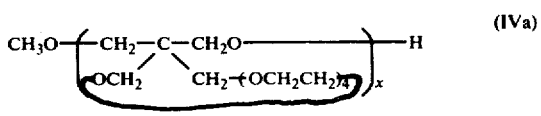
(IVa)

where the statistical average of x was about 2.5.

EXAMPLE 5 — Glycerine Initiated Polymerization

The monomer (IIIa), 6.37 g., was mixed with 0.263 g. of glycerine and three drops of $BF_3$. etherate were then added to the mixture. An exothermic reaction soon occurred and the mixture turned into a thick, viscous liquid. Gel permeation chromatography showed this polymeric product to have an average molecular weight of about 7500.

About 3.73 g. of a solution of the glycerine initiated polymer in 6 g. of benzene was then mixed with about an equivalent amount (0.215 g.) of toluene diisocyanate and 0.004 g. of triethylenediamine catalyst. No reaction appeared to occur so after about two hours, one drop of stannous octoate was added and in about 5 minutes the mixture began to cure. A film was cast and allowed to dry at about 110° C. for about 12 hours. It was a tough, flexible material. A quantity of the TDI cured polymer was broken into small particles and stirred vigorously with excess benzene for about a half hour. The solids were allowed to settle, the benzene poured off and the solids crumbled and dried. They were then washed three times with water and dried at 90° C. in a vacuum oven. These solids were then tested for sodium chloride pick-up. About 2.0 g. of the dry solids were slurried with 15 ml. of a 0.1N aqueous sodium chloride solution, at 0° C. The supernate was withdrawn with a microsyringe and titrated. Approximately 40 percent of the NaCl had been absorbed by the polymer solids. Further conductivity tests on columns loaded with the polymer solids with 0.1N solutions of potassium chloride, sodium chloride, magnesium chloride and tetramethylammonium chloride showed that the polymer significantly retarded passage of these salts through the columns, particularly sodium chloride.

EXAMPLE 6 — Trimethylolpropane Initiated Polymerization

About 4.05 g. of the monomer (IIIa) and 0.251 g. of trimethylolpropane were mixed and formed a homogeneous solution after slight heating. After cooling to room temperature, three drops of BF$_3$.etherate were added and polymerization appeared to be completed after about 10 minutes. Gel permeation chromatography of the polymeric product indicated an average molecular weight of about 1100. About 3.94 g. of this polymer was then dissolved in 4 g. of benzene and to this was added 0.453 g. of toluene diisocyanate, 0.008 g. of triethylenediamine and one drop of stannous octoate. Light heating was applied and the mixture began to thicken. This was then allowed to stand at room temperature for about 12 hours at which time the product had become a gel. The gel was dried for one hour at 100° C. in a vacuum oven then washed with benzene and water and redried to give a slightly sticky, solid polymer.

To test the salt extraction capability of the trimethylolpropane initiated polymer — TDI urethane condensation product, 2.0 g. of the urethane resin was equilibrated with 15 ml. of a 0.1 N aqueous sodium chloride solution at 0° C. The urethane resin became greatly swollen, absorbing ~7.5 ml. of the solution. The supernate was decanted and found to be only 0.65N in NaCl. The swollen urethane resin was heated to about 100° C. for a few minutes whereupon about 4.5 ml. of solution was desorbed from the resin and decanted. This desorbed solution was titrated and found to be 0.120N in sodium chloride, illustrating the ability of the resin to remove sodium chloride from solutions.

EXAMPLE 7 — Polymer on Solid Support

About 50.2 g. of monomer (IIIa) and 3.0 g. of trimethylolpropane were dissolved in 83 ml. of benzene and 25 drops of BF$_3$.etherate were used to catalyze the polymerization. After about 21 hours at room temperature, about 85 percent conversion had taken place and the mixture was then heated at about 60° C. for 3 hours to complete the reaction and at which time 0.7 g. of triethylenediamine was added to neutralize the acid catalyst.

Various amounts of about equivalent weights of the above polymer and toluene diisocyanate in benzene were mixed with dry Chromasorb P non-acid washed chromatographic support, the benzene solutions of the polymer-TDI mix being absorbed by the solid supports. After standing about 12 hours at room temperature, the solution-imbibed supports were cured at about 90° C. for 1-2 hours in a vacuum oven. Urethane loadings of from about 20 to 45 percent by weight of the solid supports were prepared. Loadings of less than about 35 weight percent were found most convenient to handle since in higher loaded materials, the urethane swelled to such an extent that it extended outside the surface of the support particles causing them to stick and clump together. All of the urethanes prepared in this manner on the supports demonstrated the ability to extract salts from aqueous solutions.

EXAMPLE 8 — Homopolymerization Onto Solid Support

A mixture of about 35.6 g. of Chromasorb P non-acid washed chromatographic support and a solution of about 24.5 g. of monomer (IIIc) represented by the formula

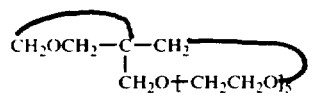

in enough methylene chloride to cover the solids, was placed in a rotary evaporator. The solvent was evaporated to leave a free flowing solid containing the monomer in its pores. BF$_3$ gas was introduced into the evacuated vessel in five portions, allowing the gas to be absorbed between additions. The solids were then heated for two hours at about 80° C. and allowed to stand for two days at room temperature. A total of 2.58 g. of BF$_3$ had been absorbed. The solids were extracted with methylene chloride, dried, extracted with water and dried again to yield about 49.4 g. of product. This represents a loading of about 28 percent of the water-swellable polymer.

The supported polymer was contacted with salt solutions and was found to be effective in extracting the salt solutions. The process was also shown to be thermally reversible. For example, 30 g. of the supported polymer containing about 8 g. of the polymer was placed in a column. Potassium thiocyanate solution (0.1 M) was passed through the column at 0° C. whereupon 0.76 g. of salt (0.0078 mole) was retained by the resin. Warming the resin to 70° C. caused approximately the same amount of salt to be expelled by the resin. Similar results were obtained with sodium thiocyanate although the efficiency was not as high. The effect varied with the type of salt. For instance, sodium chloride is not preferentially absorbed while calcium chloride and magnesium chloride were concentrated to a slight degree in the nonabsorbed solution.

EXAMPLE 9 — Polyglycidol Initiated Polymerization

A polyglycidol of about 475 average molecular weight (0.629 g.) was mixed with about 6.06 g. of the monomer (IIIa). Three drops of BF$_3$.etherate were added and the mixture was stirred with a spatula to obtain as homogenous a mixture as possible, since not all of the polyglycidol was soluble in the (IIIa) monomer. The resulting product was a very viscous, rubbery polymer. In a similar manner, 5.88 g. of monomer (IIIa) were reacted with about half as much of the polyglycidol (0.311 g.) using three drops of BF$_3$.etherate to catalyze the reaction. The product was a viscous, rubbery polymer similar to that mentioned above.

In a similar manner, polymerization of monomer (III) is initiated with polyalkylene glycols such as ethylene, propylene, polyethylene or polypropylene glycols to give polymers of the invention.

EXAMPLE 10 — Thermally Reversible Salt Absorption

The ground, dried polymer prepared from monomer (IIIa) in Example 2 was contacted by stirring with an aqueous solution of sodium chloride and the mixture allowed to equilibrate at a chosen temperature. Supernate was removed, brought to room temperature and an aliquot was titrated for chloride ions using a silver nitrate solution with potentiometric end point determination. The results are summarized in the following table, demonstrating a temperature dependent phenomenon which permits sodium salts, in this instance sodium chloride, to be reversibly absorbed by the polymer resin. The final concentration recited in the table is that of the supernate after equilibration.

Removal of Sodium Chloride from Aqueous Solution at Various Temperatures by Polymer of Monomer IIIa

| Temperature (°C.) | Initial NaCl Concentration (Molar) | Final NaCl Concentration (Molar) |
| --- | --- | --- |
| 3 | 0.100 | 0.064 |
| 14 | 0.100 | 0.082 |
| 27 | 0.100 | 0.089 |
| 35 | 0.100 | 0.094 |
| 50 | 0.100 | 0.099 |
| 85 | 0.100 | 0.103 |
| 3 | 0.498 | 0.405 |
| 16 | 0.498 | 0.436 |
| 26 | 0.498 | 0.452 |
| 65 | 0.498 | 0.494 |
| 3 | 1.01 | 0.90 |
| 15 | 1.01 | 0.91 |
| 27 | 1.01 | 0.93 |
| 50 | 1.01 | 0.96 |
| 85 | 1.01 | 1.01 |

EXAMPLE 11 — Cyclic Tetramer of (IIIa)

It was noted that an oily, liquid by-product formed when monomer (IIIa) was polymerized as in Example 2 or when a bis(hydroxymethyl) material of the formula

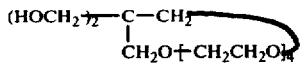

(formed by the acid hydrolysis of monomer (IIIa)) was condensed with diisocyanates. A sample of this material was obtained by extracting with methylene chloride the polymer produced from the condensation of the bis(hydroxymethyl) material and toluene diisocyanate. This sample was then extracted with hot water several times. Fine needle-like crystals formed in the aqueous supernate on cooling.

The needle-like crystals were observed to be non-birefringent but became birefringent when they had been dried in a nitrogen stream. These dehydrated crystals dissolved readily in most common solvents except hexane; they were further purified by dissolving in warm ethylene glycol dimethyl ether (glyme), cooling in an ice bath to recrystallize and sucking off the supernate with a vacuum. The crystals were again recrystallized from a 50—50 hexane-glyme mixture and dried in a nitrogen stream to give fine needles with a melting point of 93°-97° C. After recrystallizing from glyme three more times and drying, the needle-like crystalline product was analyzed by IR and NMR spectroscopy, gel permeation chromatography and in a vapor pressure osmometer. They had a molecular weight of about 1105. The structure for the crystals was found to be:

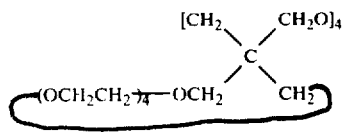

We claim:

1. A polymer comprising repeating ring-opened oxetane units represented by the formula

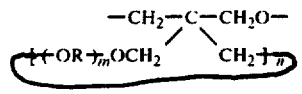

wherein m is independently, each occurrence, zero or an integer from 1 to about 10; n is an integer from 1 to 4; and —R— is an alkylene group represented by the formula

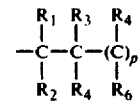

where p is zero or one and $R_1$-$R_6$ are independently hydrogen or methyl; provided that the product of at least one m and n is at least 2.

2. A polymer of claim 1 wherein n is one.
3. A polymer of claim 2 wherein m, the same each occurrence, is 4, p is zero and $R_1$, $R_2$, $R_3$ and $R_4$ are all hydrogen.
4. A polymer of claim 2 wherein m, the same each occurrence, is 5, p is zero and $R_1$, $R_2$, $R_3$ and $R_4$ are all hydrogen.
5. A water-soluble homopolymer of claim 2 wherein m is 3 to about 7.
6. A water-soluble homopolymer of claim 5 wherein m is 4, each occurrence.
7. A water-soluble homopolymer of claim 6 wherein p is zero, $R_2$, $R_4$ and one of $R_1$ and $R_3$ are hydrogen.
8. A water-soluble homopolymer of claim 7 wherein $R_1$ and $R_3$ are both hydrogen.
9. A water-swellable polymer of claim 1 wherein m is 3 to about 7.
10. A water-swellable polymer of claim 9 wherein n is 1.
11. A water-swellable polymer of claim 9 wherein m is the same, each occurrence.
12. A water-swellable homopolymer of claim 11 wherein n is 1.
13. A polymer of claim 1 which is initiated by water or an initiator bearing at least one hydroxyl group.
14. A polymer of claim 13 wherein the initiator is water.
15. A polymer of claim 13 wherein the initiator is trimethylolpropane.
16. A polymer of claim 13 wherein the initiator is a polyglycidol.
17. A polymer of claim 13 wherein the initiator is glycerine.
18. A water-swellable polymer of claim 1 which has been rendered essentially immobile in the pores of a porous solid support.
19. A water-swellable polymer of claim 18 wherein n is 1, p is zero, $R_1$, $R_2$, $R_3$ and $R_4$ are all hydrogen and m, each occurrence, one of 4 and 5.
20. A polymer of claim 1 which further comprises at least one adsorbed alkali metal or alkaline earth metal salt.
21. A water-swellable polymer of claim 1 wherein n is 1, m is 4 or 5, p is zero, $R_1$, $R_2$, $R_3$ and $R_4$ are all hydrogen which further comprises at least one adsorbed alkali metal or alkaline earth metal salt.
22. A water initiated, water-swellable homopolymer of claim 21 wherein m is 4, and wherein at least sodium chloride is sorbed.

* * * * *